United States Patent
Helfrich et al.

(10) Patent No.: US 8,480,027 B2
(45) Date of Patent: Jul. 9, 2013

(54) MOVABLE STORAGE UNIT FOR AN ACCOMMODATION MODULE OF AN AIRCRAFT

(75) Inventors: Felix Helfrich, Hamburg (DE); Jovan Ulbrich-Gasparevic, Pinneberg (DE)

(73) Assignee: Airbus Operations GmbH (DE)

( * ) Notice: Subject to any disclaimer, the term of this patent is extended or adjusted under 35 U.S.C. 154(b) by 438 days.

(21) Appl. No.: 12/544,488

(22) Filed: Aug. 20, 2009

(65) Prior Publication Data
US 2010/0044509 A1    Feb. 25, 2010

Related U.S. Application Data

(60) Provisional application No. 61/189,987, filed on Aug. 25, 2008.

(30) Foreign Application Priority Data

Aug. 25, 2008  (DE) .................. 10 2008 039 637

(51) Int. Cl.
  *B64D 11/00* (2006.01)
(52) U.S. Cl.
  USPC ........................... 244/118.5; 244/119
(58) Field of Classification Search
  USPC ............................... 244/118.5, 119
  See application file for complete search history.

(56) References Cited

U.S. PATENT DOCUMENTS

| | | | |
|---|---|---|---|
| 5,842,668 A * | 12/1998 | Spencer ..................... | 244/118.1 |
| 6,003,813 A | 12/1999 | Wentland et al. | |
| 6,056,239 A * | 5/2000 | Cantu et al. ................ | 244/118.6 |
| 6,062,509 A * | 5/2000 | Burrows et al. ............ | 244/118.5 |
| 6,536,710 B1 * | 3/2003 | Bobzien et al. ............. | 244/119 |
| 6,886,781 B2 * | 5/2005 | Lau et al. ................... | 244/118.1 |
| 7,380,752 B2 * | 6/2008 | Guard et al. ............... | 244/118.5 |
| 2002/0074913 A1 | 6/2002 | Lau et al. | |
| 2003/0019976 A1 * | 1/2003 | Cheung ..................... | 244/118.5 |
| 2007/0284479 A1 * | 12/2007 | Pein et al. .................. | 244/118.2 |
| 2008/0078870 A1 | 4/2008 | Kneller et al. | |
| 2008/0078871 A1 * | 4/2008 | Munson et al. ............ | 244/118.5 |
| 2009/0050738 A1 * | 2/2009 | Breuer et al. .............. | 244/118.5 |
| 2009/0230244 A1 * | 9/2009 | Kofinger et al. ........... | 244/118.5 |

FOREIGN PATENT DOCUMENTS

| | | |
|---|---|---|
| DE | 10063932 A1 | 7/2002 |
| DE | 102006016509 A1 | 10/2007 |
| DE | 10 2007 009 278.6 | 8/2008 |
| EP | 0901962 A2 | 3/1999 |
| WO | 2008022688 A1 | 2/2008 |
| WO | 2008104529 A2 | 9/2008 |

* cited by examiner

*Primary Examiner* — Tien Dinh
*Assistant Examiner* — Justin Benedik
(74) *Attorney, Agent, or Firm* — Lerner, David, Littenberg, Krumholz & Mentlik, LLP

(57) ABSTRACT

According to an exemplary embodiment of the invention, a storage module is stated that is positioned in a region between two frame elements of an aircraft and that can be moved to a folded-out state. The storage unit forms part of a crew rest compartment in an aircraft.

16 Claims, 2 Drawing Sheets

MOVABLE STORAGE UNIT FOR AN ACCOMMODATION MODULE OF AN AIRCRAFT

CROSS-REFERENCE TO RELATED APPLICATIONS

This application claims the benefit of the filing date of U.S. Provisional Patent Application No. 61/189,987 filed Aug. 25, 2008, the disclosure of which is hereby incorporated herein by reference.

BACKGROUND OF THE INVENTION

The invention relates to the storage of items of baggage in aircraft. In particular, the invention relates to a storage module for a region in an aircraft; to an accommodation space for an aircraft with a storage module; to an aircraft comprising a storage module; to the use of a storage module in an aircraft; and to a method for storing an item of baggage in an aircraft.

At present, crew accommodation and crew rest compartments, in the following denoted as crew rest compartments (CRCs), are installed in various positions in an aircraft. For example, crew rest compartments are installed on the main deck or above the passenger cabin (so-called overhead crew rest compartments, OHCRCs) or below the main deck (for example bulk crew rest compartments, BCRCs).

At present, overhead crew rest compartments are designed in the form that installation of a chain of hatrack units that are located underneath the crew rest compartment may be possible. In this way almost the entire hatrack storage space may be available to passengers. In contrast to this, the storage facilities for the crew in the crew rest compartment may be limited and thus space inside the CRC may be limited also.

In present-day aircraft, crew rest compartments with specified sizes for storage units that are arranged at defined positions within the crew rest compartment are often installed in aircraft. Often, due to the limited available design space in the crew rest compartment, items of baggage are not stored in the storage regions but instead outside the crew rest compartment, for example in baggage storage compartments, so-called hatracks.

Such storage units may take up a lot of space in the crew rest compartment. In this arrangement a particular volume of storage space may be mandatory. If more storage space volume is required, in some crew rest compartments it even becomes necessary to remove a bed.

US 2008/078870 A shows hatracks that are attached to the load-bearing structure (e.g. the primary structure) of the aircraft. WO 08022688 A also shows hatracks that are attached to the supporting structure of the aircraft. In both these arrangements the hatracks take up a relatively large amount of space.

DE 10 2007 009 278.6 shows a crew rest compartment with a storage unit that is mounted in the interior of the module.

SUMMARY OF THE INVENTION

Stated are: a storage module for a region in an aircraft, an accommodation space for an aircraft, an aircraft, the use, and a method according to the characteristics of the independent claims. Exemplary embodiments of the invention are stated in the subordinate claims.

The exemplary embodiments described relate equally to the storage unit, the accommodation space, the aircraft, the use, and the method.

According to an exemplary embodiment of the invention, a storage module for a region in an aircraft is stated which comprises a storage unit for storing an item of baggage, wherein the storage module is designed to be mounted in a region between two frame elements of the aircraft.

In other words, for its mounting, the storage module uses the space between the fuselage frame elements, and makes this space available as storage space. Thus the storage module largely no longer projects into the interior of the aircraft cabin or into the interior of an accommodation module for the crew, but instead is essentially or completely mounted outside this region, between the frame elements.

According to a further exemplary embodiment of the invention, the region in the aircraft in which the storage module with the storage unit is mounted is an accommodation space for members of the crew. This accommodation space may, for example, be designed in the form of a crew rest compartment that is arranged in an overhead region of the aircraft, a so-called overhead crew rest compartment.

Moreover, the accommodation space may be an accommodation module that is arranged below the passenger cabin, a so-called bulk crew rest compartment.

The storage module may be retrofitted to the crew rest compartment, or it may be provided already at the time of manufacture of the crew rest compartment. In the latter case the frame or the housing of the storage module may have been manufactured in one piece with the corresponding segment of the crew rest compartment.

According to a further exemplary embodiment of the invention, the storage unit of the storage module is movably held so that the storage unit can be moved from a closed position to an open position, wherein the item of baggage in the open position of the storage unit can be slid into the storage unit, and wherein the item of baggage in the closed position of the storage unit is secured against sliding out of the storage unit.

In this way, safe, secure and efficient storage of items of baggage may be possible.

In particular, it may also be possible to provide personal storage modules or personal storage units for each member of the crew, wherein said storage modules or storage units can, for example, be used to hold personal valuables, newspapers etc. of the individual members of the crew.

According to a further exemplary embodiment of the invention, the storage unit comprises a locking mechanism, wherein the locking mechanism is designed such that from the passenger cabin the storage unit is only accessible to selected users.

For example, according to a further exemplary embodiment of the invention, the locking mechanism may be designed in the form of a combination lock, an electronic lock or a sensor for scanning a fingerprint, or it can comprise such an element.

This may ensure that the storage unit can only be accessed by defined users, for example the on-board crew. Furthermore, access may be individualised in such a way that in each case a particular storage unit may only be opened by a defined user. In this way any use by passengers is impossible so that emergency equipment or similar items may be stored in said storage unit, which equipment or items must only be operated by members of the crew.

According to a further exemplary embodiment of the invention, the storage unit comprises an axial bearing arrangement for moving from the open position to the closed position.

For example, a simple axial bearing arrangement is provided, around whose axis the storage unit is tilted from the closed position to the open position. It may also be possible to provide several axes which may make it possible to swivel the storage unit from the closed position to the open position (see for example FIG. 1).

According to a further exemplary embodiment of the invention, the storage unit comprises a movable bearing arrangement for moving the storage unit from the open position to the closed position. For example, the storage may can be moved in and out in the manner of a drawer unit.

According to a further exemplary embodiment of the invention, the storage module comprises an unlocking and moving mechanism for unlocking and moving the storage unit from the closed position to the open position.

This mechanism can, for example, comprise spring elements that make it possible for the storage unit to move out automatically after it has been unlocked. Likewise, the movement mechanism can also be designed for largely automatic moving in of the storage unit, or it can mechanically support moving in or folding in of the storage unit.

According to a further exemplary embodiment of the invention, an accommodation space for an aircraft with a storage module as described above is stated.

According to a further exemplary embodiment of the invention, the accommodation space is an overhead crew rest compartment arranged in the overhead region of a passenger cabin of the aircraft.

According to a further exemplary embodiment of the invention, the storage unit is arranged in the region of a bed of the accommodation space so that the member of the crew may simply and easily access the storage unit when s/he is in the region of the bed or is lying on the bed.

According to a further exemplary embodiment of the invention, the use of a storage module, as described above, in an aircraft is stated.

According to a further exemplary embodiment of the invention, a method for stowing an item of baggage in a storage unit in an aircraft is stated, in which method the storage unit is unlocked; the storage unit is moved out from a closed position in a region between two frame elements of the aircraft to an open position; loading an item of baggage into the storage unit takes place; and subsequently the storage unit is moved in from the open position to the closed position.

Since the storage unit is situated between the frame elements, the passengers or crew members have more accommodation space available.

Below, exemplary embodiments of the invention are described with reference to the figures.

DETAILED DESCRIPTION

Figure 1:
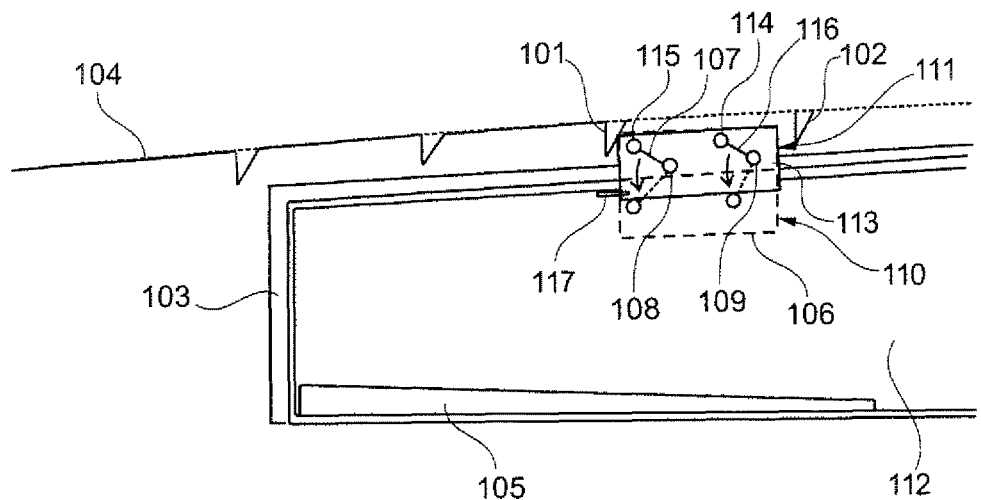
FIG. 1 shows a diagrammatic section view of a partial region of a sleeping module with a retractable recessed storage unit according to an exemplary embodiment of the invention.

The illustrations in the figures are diagrammatic and not to scale.

In the following description of the figures the same reference characters are used for identical or similar elements.

FIG. 1 shows a section view of a partial region of a crew rest compartment (accommodation space) according to an exemplary embodiment of the invention. The crew rest compartment 103 comprises one or several beds or mattresses 105. In the region of the beds 105, movable storage modules 106 are affixed.

The storage modules 106 comprise a folded-out position 110 and a folded-in position 111. In the folded-in position each storage module is at least largely in a region between two adjacent frame elements 101, 102. In the folded-out state 110 the storage module 106 projects at least partly or largely or even completely into the interior 112 of the crew rest compartment 103 so that it is readily accessible to the member of the aircrew who is seated or lying on the bed 105.

To this effect a frame, a housing or a supporting element 113 is provided, which is rigidly connected to the crew rest compartment 103 or as an alternative to one or both frame elements 101, 102 or to the load-bearing structure of the aircraft. This frame, this housing or this supporting element 113 forms part of the storage module. On the supporting element 113 a movement- or rotation mechanism is mounted by means of which the storage unit 106 can be moved from the folded-in position 111 to the folded-out position 110 (and back).

In the case of the exemplary embodiment of FIG. 1, two axial bearing arrangements 108, 109 are provided for this, which are connected by way of connecting elements 107, 116 to corresponding axial bearings 115, 114 of the storage unit 106.

The opening mechanism may, for example, comprise spring support or dampers (as they are at times already used with hatracks). In order to be able to achieve movement, in the manner indicated in FIG. 1, of the storage unit, corresponding pivoting levers are necessary, which in combination with springs/dampers make possible controlled opening/closing of the storage unit. The opening mechanism can be implemented by way of a classic closure arrangement (for example in the same manner as in an automotive glove box) or as a push button with spring support (for example in the same manner as in an automotive sunglasses compartment).

By activating an unlocking mechanism 117 the folded-in storage unit is unlocked and can (for example by gravity alone) be moved to the folded-out state. In this process the connecting elements 107, 116 move in the direction of the arrows.

Reference character 104 designates the exterior skin of the aircraft.

Figure 2:
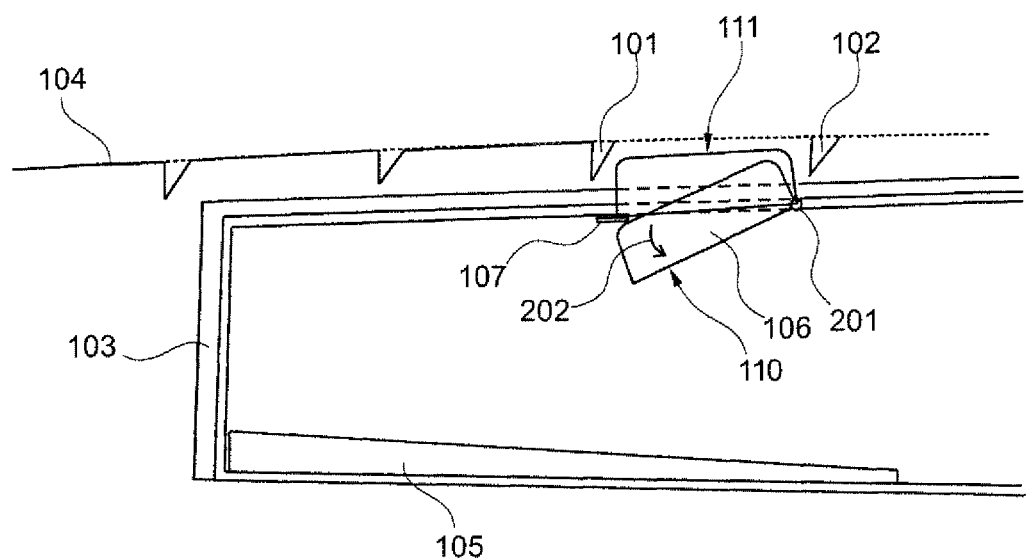
FIG. 2 shows a diagrammatic section view of a partial region of a sleeping module with a storage unit according to a further exemplary embodiment of the invention.

FIG. 2 shows a further example of a storage module that is integrated in a crew rest compartment 103. In this exemplary embodiment the storage module is held by way of a single axis 201 on which the storage unit 106 can be moved from the folded-in position 111 to the folded-out position 110 in the direction of the arrow 202 after the locking mechanism has been deactivated.

The locking mechanism is, for example, a movable locking bar or a locking-bar device that may be deactivated by way of a push button, and that automatically clicks into the locked position when the storage unit is folded up. "Locking" in the context of the invention can mean locking/unlocking such as by use of a key, key pad (electronic or mechanical), or combination lock, or merely latching or securing so that something can be manipulated to secure the storage unit in its closed or folded-in state or manipulated or activated (unlocking) before the storage unit is opened.

Analogously to FIG. 1, the locking mechanism may comprise opening mechanisms, e.g. spring-assisted ones. The use of dampers is also possible. Furthermore, opening may take place by means of gravity. Moreover, it may be possible to design the storage unit as a module (with only the module's face pointing towards the lock being open, and with all the other 5 faces forming a solid unit) or as an "open" storage unit that is moved into a "hood" attached to the compartment. The decisive point is that the storage unit is positioned and arranged between the frame elements, which results in the clever use of available space.

Thus one or several extendable or fold-out storage units are provided which, for example, are designed in a manner that is similar to that of a glove box in a motor vehicle. With clever utilisation of the space between the individual frame elements of the aircraft, the available space may be used effectively. In this arrangement the storage unit can, for example, be integrated in the crew rest compartment directly above or near a bed. Such a storage unit or storage module can be arranged in the region of each individual bed. In this way each crew member has a personal storage unit of their own. With the push of a button, these movable storage units can be moved out when required, and when no longer required can be moved back into the space between the individual frame elements, above the ceiling of the crew rest compartment. For example, the storage modules are installed in the region of each individual bed, for example at the foot end of each of these beds.

Of course, the storage modules may be installed in the entire aircraft cabin if the available space allows this. Furthermore, the storage unit may also be designed as a non-movable storage unit that is arranged between two frame elements. In this way, installation- and production expenditure is further reduced.

Figure 3:
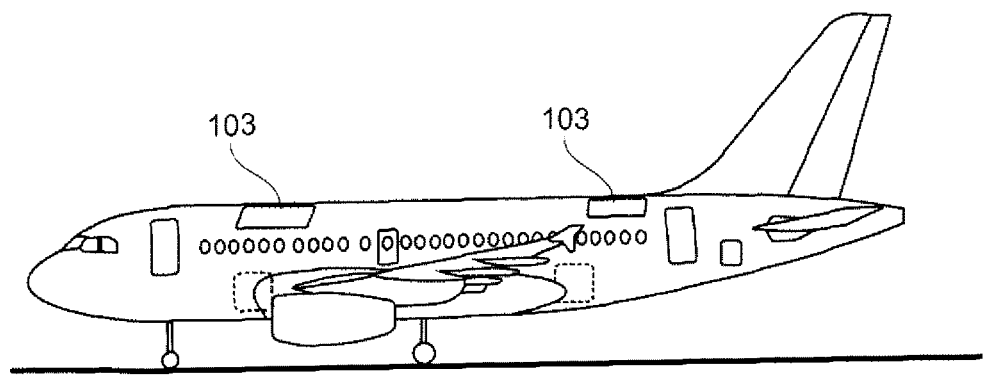
FIG. 3 shows an aircraft comprising a crew rest compartment according to an exemplary embodiment of the invention.

FIG. 3 shows an aircraft comprising a crew rest compartment 103 according to an exemplary embodiment of the invention. The crew rest compartment 103 can, for example, be arranged as an overhead crew rest compartment, i.e. above the passenger cabin, or as an alternative as a bulk crew rest compartment, i.e. below the passenger cabin. Furthermore, the crew rest compartment 103 can be arranged in a rear region, in a middle region, or in a front region of the aircraft. In the latter case, access to the crew rest compartment exclusively by way of the cockpit region can be provided.

Figure 4:
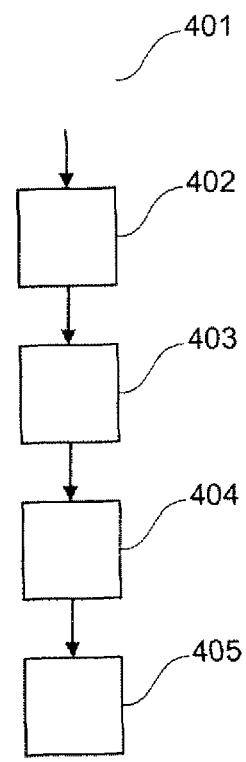
FIG. 4 shows a flow chart of a method according to an exemplary embodiment of the invention.

FIG. 4 shows a flow chart of a method according to an exemplary embodiment of the invention. In step 401 the storage unit is unlocked by way of activation of a push button. In step 402 the storage unit is moved from a closed position between two frame elements of the aircraft to an open position. In step 403 an item of baggage is placed in the storage unit, and in step 404 the storage unit is moved from the open position back to the closed position. In step 405 automatic locking of the storage unit in the closed position takes place so that the item of baggage is safely and securely stored.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A crew rest compartment arranged in an aircraft cabin, the crew rest compartment comprising a storage module, the storage module comprising:

a storage unit for storing an item and configured to move from a closed position to an open position;

wherein, in the closed position, the storage module is substantially disposed in a space defined between first and second adjacent fuselage frame elements of the aircraft, an exterior skin of the aircraft and a lining defining an interior of the crew rest compartment; and wherein, in the closed position, the storage module uses the space between the first and second adjacent fuselage frame elements, the exterior skin and the lining, the space being substantially or completely outside the interior of the crew rest compartment, thereby making the space available as storage space wherein in the open position, the storage module at least partially extends into the interior of the crew rest compartment.

2. The crew rest compartment of claim 1,
wherein the crew rest compartment is arranged in the overhead region of the aircraft.

3. The crew rest compartment of claim 1,
wherein the storage unit of the storage module is movably held so as to move from a closed position to an open position;
wherein the item to be stored in the storage unit, in the open position of the storage unit, is slid into the storage unit; and
wherein the item in the closed position of the storage unit is secured against sliding out of the storage unit.

4. The crew rest compartment of claim 1,
wherein the storage unit comprises an axial bearing arrangement for moving the storage unit from the open position to the closed position.

5. The crew rest compartment of claim 1,
wherein the storage unit comprises a movable bearing arrangement for moving the storage unit from the open position to the closed position.

6. The crew rest compartment of claim 1,
wherein the storage module comprises an unlocking and moving mechanism for unlocking and moving the storage unit from the closed position to the open position.

7. The crew rest compartment of claim 1,
wherein the storage unit is arranged in the region above a bed of the crew rest compartment.

8. The crew rest compartment of claim 1, wherein the storage module is substantially or completely mounted outside the interior of the crew rest compartment and between the first and second adjacent fuselage frame elements, with a minimal or no projection into the interior of the crew rest compartment.

9. The crew rest compartment of claim 1, wherein the storage unit of the storage module is movably held so as to move from a closed position to an open position, and
wherein in the open position, the storage module is displaced from the space between the first and second adjacent fuselage frame elements and outside the interior of the crew rest compartment such that the storage module projects at least partly into the interior of the crew rest compartment.

10. The crew rest compartment of claim 1, wherein the storage unit comprises a frame connected on a first side thereof to the first fuselage frame element and on a second side thereof to the second adjacent fuselage frame element.

11. An aircraft comprising a crew rest compartment in an aircraft cabin, said crew rest compartment comprising:
a storage module for a region in an aircraft, with the storage module comprising:
a storage unit for storing an item and configured to move from a closed position to an open position;

wherein, in the closed position, the storage module is substantially disposed in a space defined between first and second adjacent fuselage frame elements of the aircraft, an exterior skin of the aircraft and a lining defining an interior of the crew rest compartment; and wherein, in the closed position, the storage module uses the space between the first and second adjacent fuselage frame elements, the exterior skin and the lining, the space being substantially or completely outside the interior of the crew rest compartment, thereby making the space available as storage space wherein in the open position, the storage module at least partially extends into the interior of the crew rest compartment.

12. The aircraft of claim 11, wherein the storage module is substantially or completely mounted outside the interior of the crew rest compartment and between the first and second adjacent fuselage frame elements, with a minimal or no projection into the interior of the crew rest compartment.

13. A method for stowing an item in a storage unit in a crew rest compartment in an aircraft, the method comprising:

moving the storage unit from a closed position in a space defined between first and second adjacent fuselage frame elements of the aircraft, an exterior skin of the aircraft and a lining defining an interior of the crew rest compartment, the space being substantially or completely outside the interior of the crew rest compartment to an open position;

loading an item into the storage unit; and moving the storage unit from the open position to the closed position;

wherein, in the closed position, the storage module uses the space between the first and second adjacent fuselage frame elements, the exterior skin and the lining, the space being substantially or completely outside the interior of the crew rest compartment, thereby making the space available as storage space.

14. The method of claim 13 further comprising unlocking the storage unit before moving the storage unit from a closed position to an open position.

15. A method of removing a stored item in a storage unit in a crew rest compartment in an aircraft, with the method comprising the steps of:

moving the storage unit from a closed position in a space defined between first and second adjacent fuselage frame elements of the aircraft, an exterior skin of the aircraft and a lining defining an interior of the crew rest compartment, the space being substantially or completely outside the interior of the crew rest compartment to an open position;

unloading an item from the storage unit; and moving the storage unit from the open position to the closed position, wherein, in the closed position, the storage module uses the space between the first and second adjacent fuselage frame elements, the exterior skin and the lining, the space being substantially or completely outside the interior of the crew rest compartment, thereby making the space available as storage space wherein in the open position, the storage module at least partially extends into the interior of the crew rest compartment.

16. The method of claim 15 further comprising locking the storage unit after moving the storage unit from an open to a closed position.

* * * * *

UNITED STATES PATENT AND TRADEMARK OFFICE
CERTIFICATE OF CORRECTION

PATENT NO. : 8,480,027 B2
APPLICATION NO. : 12/544488
DATED : July 9, 2013
INVENTOR(S) : Felix Helfrich and Jovan Ulbrich-Gasparevic It is certified that error appears in the above-identified patent and that said Letters Patent is hereby corrected as shown below:

In the Specification

Column 8, line 4, "space." Should read -- space. Wherein in the open position, the storage module at least partially extends into the interior of the crew rest compartment --.

Signed and Sealed this
Sixth Day of October, 2015

Michelle K. Lee
*Director of the United States Patent and Trademark Office*